(12) United States Patent
Ai et al.

(10) Patent No.: US 10,890,417 B2
(45) Date of Patent: *Jan. 12, 2021

(54) COMPOUND EYE LASER TRACKING DEVICE

(71) Applicant: LUMINIT LLC, Torrance, CA (US)

(72) Inventors: Jun Ai, Torrance, CA (US); Fedor Dimov, Torrance, CA (US); Russell Kurtz, Torrance, CA (US); Emmanuel Gorce, Torrance, CA (US)

(73) Assignee: LUMINIT LLC, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,494

(22) Filed: May 7, 2019

(65) Prior Publication Data

US 2020/0378725 A1 Dec. 3, 2020

Related U.S. Application Data

(63) Continuation-in-part of application No. 15/085,662, filed on Mar. 30, 2016, now Pat. No. 10,281,551.

(60) Provisional application No. 62/140,191, filed on Mar. 30, 2015.

(51) Int. Cl.
| | |
|---|---|
| *G01S 3/786* | (2006.01) |
| *G01S 3/781* | (2006.01) |
| *F41G 7/22* | (2006.01) |
| *G02B 5/32* | (2006.01) |
| *G03H 1/00* | (2006.01) |
| *G02B 19/00* | (2006.01) |

(52) U.S. Cl.
CPC ............. *F41G 7/2293* (2013.01); *G02B 5/32* (2013.01); *G02B 19/0047* (2013.01); *G03H 1/0005* (2013.01); *G03H 2223/16* (2013.01)

(58) Field of Classification Search
CPC .......... G01S 3/786; G01S 3/785; G01S 3/782; G01S 3/783; G01S 3/784; G01S 3/781; F41G 7/226; F41G 7/2213; F41G 7/2293; G02B 5/32; G02B 19/0047; G03H 1/0005; G03H 2223/16
See application file for complete search history.

(56) References Cited

U.S. PATENT DOCUMENTS

| | | | |
|---|---|---|---|
| 4,094,577 | A | 6/1978 | Spitz |
| 4,286,760 | A | 9/1981 | Couderc |
| 4,479,717 | A | 10/1984 | Cornillault |
| 4,585,948 | A | 4/1986 | Schneider |
| 4,625,108 | A | 11/1986 | Nestel |

(Continued)

*Primary Examiner* — John R Lee
(74) *Attorney, Agent, or Firm* — Lathrop GPM, LLP; Laura A. Labeots

(57) ABSTRACT

The Compound Eye Laser Illumination Seeker (CELIS) is a tracking system used to guide items to point at a laser-illuminated target, with the illumination being either pulsed or modulated at either a specific rate or within a range of rates. The CELIS, comprising a multiaperture compound receiver optics (MACRO) to collect the signal, a set of light guides to combine the received light into light representing individual angular sectors and redirect it to detectors whose output represents the illumination signal in that quadrant, a spectral filter, an angle filter, the set of detectors, and processing electronics. The output is an electronic signal indicating the angular difference between the pointing direction of the signal and the pointing direction of the tracking device.

18 Claims, 2 Drawing Sheets

(56) References Cited

U.S. PATENT DOCUMENTS

| | | | |
|---|---|---|---|
| 4,674,874 A | 6/1987 | Halldorsson | |
| 4,778,990 A | 10/1988 | Laughlin | |
| 4,893,025 A | 1/1990 | Lee | |
| 4,965,453 A | 10/1990 | Hoschette | |
| 5,008,543 A * | 4/1991 | Bertrand | G01C 3/18 250/342 |
| 5,015,844 A | 5/1991 | Cole | |
| 5,023,440 A | 6/1991 | Kuppenheimer, Jr. | |
| 5,243,179 A | 9/1993 | Bjorkman | |
| 5,517,019 A | 5/1996 | Lopez | |
| 5,606,434 A | 2/1997 | Feldman | |
| 5,920,337 A | 7/1999 | Glassman | |
| 6,429,954 B1 | 8/2002 | Kasai | |
| 6,507,392 B1 | 1/2003 | Richards | |
| 6,987,258 B2 | 1/2006 | Mates | |
| 7,185,845 B1 | 3/2007 | Hartman | |
| 7,276,681 B2 | 10/2007 | Alexander | |
| 7,286,295 B1 | 10/2007 | Sweatt | |
| 7,587,109 B1 | 9/2009 | Reininger | |
| 7,742,151 B2 | 6/2010 | Krasutsky | |
| 7,839,550 B1 | 11/2010 | Billmers | |
| 8,259,291 B2 | 9/2012 | Taylor | |
| 8,427,657 B2 * | 4/2013 | Milanovi | G01B 11/002 250/342 |
| 8,766,808 B2 | 7/2014 | Hogasten | |
| 10,281,551 B2 * | 5/2019 | Ai | G01S 3/786 |
| 2002/0031295 A1 | 3/2002 | Sasaki | |
| 2005/0093757 A1 | 5/2005 | Kiernan, Jr. | |
| 2005/0279917 A1 | 12/2005 | Barrett | |
| 2006/0236721 A1 | 10/2006 | Franck | |
| 2007/0237490 A1 | 10/2007 | Reininger | |
| 2009/0314929 A1 | 12/2009 | Lee | |
| 2010/0001119 A1 | 1/2010 | Lindgren | |
| 2011/0174917 A1 * | 7/2011 | Dold | F41G 7/007 244/3.15 |
| 2012/0001058 A1 | 1/2012 | Luke | |
| 2012/0013967 A1 | 1/2012 | Kim | |
| 2014/0117260 A1 | 5/2014 | Woida-O'Brien | |
| 2014/0231650 A1 | 8/2014 | Streuber | |
| 2014/0312161 A1 | 10/2014 | Ell | |
| 2015/0015701 A1 * | 1/2015 | Yu | H04N 5/2259 348/136 |
| 2015/0177381 A1 | 6/2015 | Yap | |
| 2015/0253111 A1 | 9/2015 | Caplan | |
| 2015/0268345 A1 | 9/2015 | Ell | |
| 2015/0325723 A1 | 11/2015 | Shi | |
| 2015/0362651 A1 | 12/2015 | Voloschenko et al. | |
| 2015/0377590 A1 | 12/2015 | Roncone | |
| 2016/0161587 A1 | 6/2016 | Caplan | |
| 2016/0185447 A1 | 6/2016 | Miralles | |
| 2016/0216075 A1 | 7/2016 | Trail | |
| 2016/0291115 A1 | 10/2016 | Ai et al. | |
| 2016/0291442 A1 | 10/2016 | Ai | |
| 2017/0041534 A1 | 2/2017 | Xia | |
| 2017/0102264 A1 | 4/2017 | Harder | |
| 2018/0188685 A1 | 7/2018 | Dimov et al. | |

\* cited by examiner

COMPOUND EYE LASER TRACKING DEVICE

FIELD OF THE INVENTION

This invention is in the field of optics, and more particularly deals with tracking and sensing devices.

BACKGROUND OF THE INVENTION

There is a need for a wide field-of-view compound eye optics for semi-active laser (SAL) spot-tracking missile seekers to provide precision guidance to targets, for illuminated image tracking, and for image sensing, all in the presence of elevated background illumination. An ideal device to meet these needs would provide a wide field of view (>10° cone angle) without the need for moving parts. The device would include spectral and angle filtering in the optical portion, plus electrical noise reduction. The background illumination could include the sun in the FOV and within 1° of the target. The illumination could, for example, be a near-infrared (NIR), repetitively pulsed laser. The device would produce an electronic signal to enable a tracking system to follow the target. Such a signal could, for example, be a simple set of voltages or digital data, indicating whether or not the target is centered in the FOV of the device and, if it is not centered, indicating the direction off center where the target is located.

Current SAL seekers, for example, use single aperture optics and suffer from a limited FOV (about 10°), which is insufficient to search for and acquire the target. The seekers also suffer from relatively high ambient noise, both electronically and in the optical portion; they are therefore inefficient in blocking bright sunlight. Illuminated image-tracking and -sensing devices suffer from the same difficulties.

SUMMARY OF THE INVENTION

The Compound Eye Laser Tracking devices of the subject invention is a tracking system used to guide items to strike a laser-illuminated target. The laser illuminator is modeled as a short-pulse laser operating at 1.064 µm, operating at a repetition rate of at least 100 Hz. The tracking device accurately tracks the illuminated spot even when the direction of the sun is very close to the direction to the illuminated spot, and initially finds the illuminated spot in a 50° cone field of view (FOV). The final tracking device fits within a cylinder whose diameter is 2.75 in. (70 mm) and whose length is roughly 6 in. (150 mm), and it does not require moving parts. The tracking device output is two dc voltages, one to guide the item in elevation, the other in azimuth.

The subject invention includes a method of tracking an optical signal in the presence of optical noise, having the steps of collecting a signal with a lens array, filtering the signal to select specific wavelengths or wavelength ranges, filtering the signal to limit the angular field of view of each lens, directing the signal to one or more photodetectors, and processing the output(s) of the photodetector(s) so that signals are produced which describe the angular difference between the pointing direction of the signal and the pointing direction of the tracking device. The lens array may be mounted to a curved surface and is biometrically inspired.

The Compound Eye Laser Tracking Device of the subject invention not only tracks illumination signals, it can also generate position sensitive data that can be processed to calculate azimuth and elevation corrections. This data can also be used for angle measurement, parallax, and multipoint coordination. Thus, One may locate the target in three dimensions; One may use the measurement to align several objects together and keep them in the same relative positions (such as constellations of satellites or groups of aircraft); further, one may use the measurement to keep a line of vehicles separated at constant distances (such as convoys of self-driving trucks), and thus avoid collisions.

Further, a holographic system may be used as a spectral and/or angular filter and may be a substrate-guided holographic filter. The method of directing the optical signal to one or more photodetectors may be by an optical fiber bundle, and can be a light guide. Filtering the signal to limit the angular field of view may involve the light guide which may select specific wavelengths with an optical bandpass filter, may be formed from a combination of a shortpass filter and a longpass filter. The photodetector can be a single detector whose output indicates the position of the light on the detector and may be a plurality of detectors. The electronics may include noise filtering. The electrical output signal may be analog or digital.

CONCISE DESCRIPTION OF THE DRAWINGS

DETAILED DESCRIPTION OF THE DRAWINGS

Figure 1:
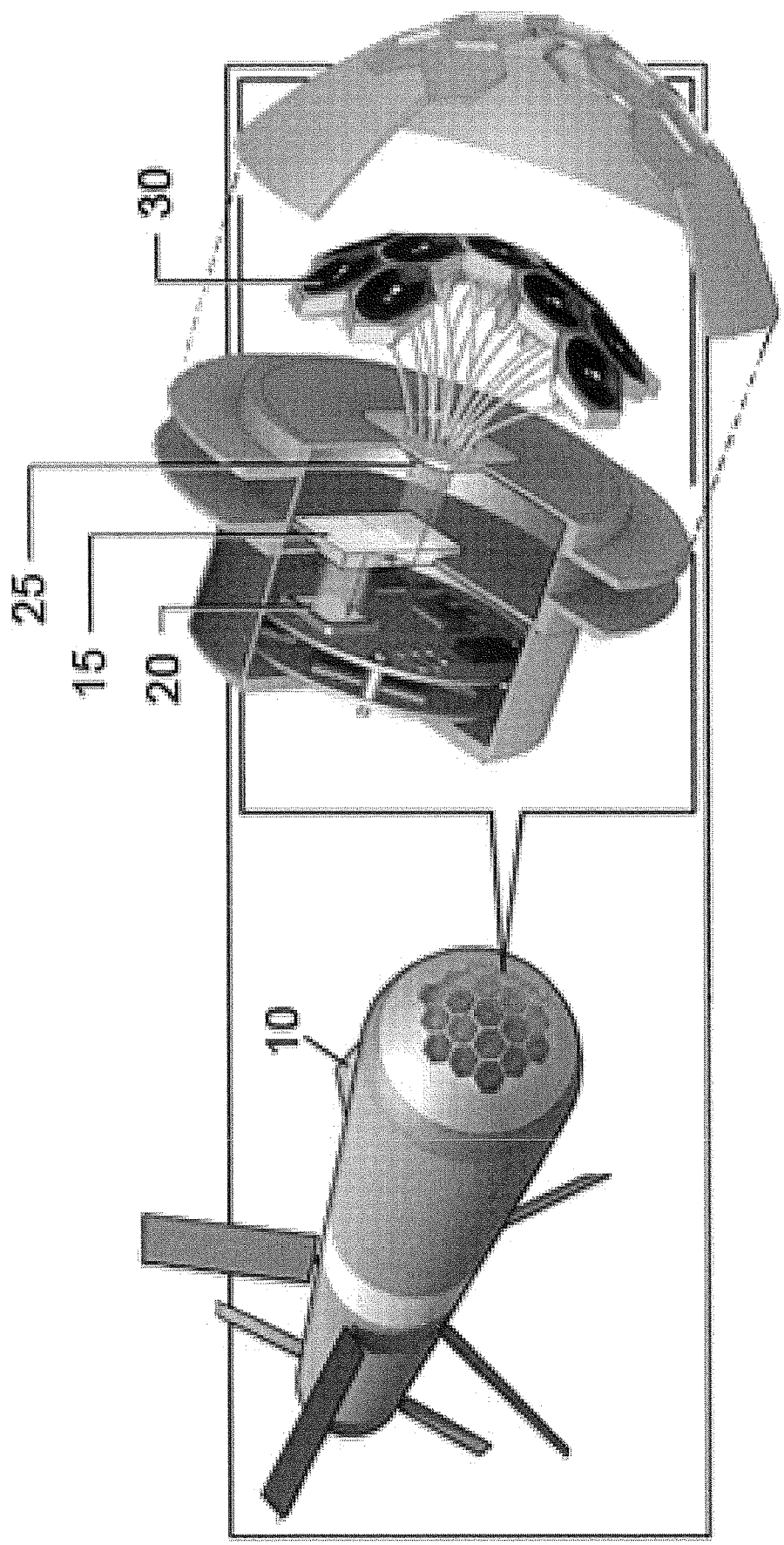
FIG. 1 shows a Compound Eye Laser Missile Seeker (Tracking Device).

The subject invention resolves these issues, being an innovative wide field-of-view, compound eye, laser illumination seeker (10), based on multiaperture compound receiver optics (MACRO) with a spectral and angle filter. CELIS includes a MACRO, made of a lens array 30 aligned with a light-guide array 25, an angle filter 15, a spectral filter 15, a set of detectors 20 (typically four), and electronics and software FIG. 1). In the configuration of a missile cruising to the target area, an external designator sends laser pulses to mark the target, and the MACRO receives the diffused reflection light from the target and creates a laser spot image. The angle and spectral filters, combined with light guides, fiber optic bundles, and/or holographic optical elements, directs the target laser beam to the detectors, which act as signal position sensors. The angle and spectral filters eliminate most extraneous light, such as bright background illumination, before it reaches the detectors. The electronics further filter the output of the detectors, then process the position-sensitive signals and calculate the azimuth and elevation corrections. These correction signals are sent to the direction control subsystem of the missile, which implements the corrections and steers the missile so that the laser spot moves from the edge to the center in the FOV to track the target. In the sensing and fixed target tracking configurations, the azimuth and elevation signals are used to direct the sensor, keeping it pointed at the target. The MACRO emulates a biologically-inspired compound eye, enabling CELIS to provide a constant, wide FOV, eliminating the need for a gimbal.

The subject invention uses angular- and spectrally-selective filters, which eliminate the interference of solar light and allow simple integration with a quad detector 50, a position detector, or several individual detectors, resulting in a compact device package that can be easily implemented within a small volume. A substrate-guided holographic (SGH) relay 45 can be used as a combined angular and spectral filter. The SGH comprises two holographic optical element (HOE) lenses integrated on a flat glass substrate The two HOE lenses can be fabricated in a holographic photopolymer film and can offer over 80% throughput (diffraction efficiency) with an out-of-band rejection ratio about 60 dB or OD 6. Only photons that satisfy both the Bragg wavelength and Bragg angle simultaneously are diffracted by the SGH filter and reach the detector. Other photons that have different incident angles or wavelengths, such as bright sunlight, are rejected by the SGH filter, and will not reach the detector; thus, a low noise and high signal-to-noise ratio (SNR) can be achieved. If the SGH filter is not included, separate angle and spectral filters must be used. The angle filter can be, for example, a light guide design that restricts the FOV of each lens of the MACRO. The spectral filter can be, for example, a narrowband interference filter.

- Capable of tracking an illumination laser, which is pulsed or modulated and operates at a specific wavelength
- Capable of rejecting a bright, broadband background source within 1° from the target
- Capable of rejecting a bright, broadband illumination of the target
- Wide field of view>10° full cone angle
- No moving parts.

Figure 2:
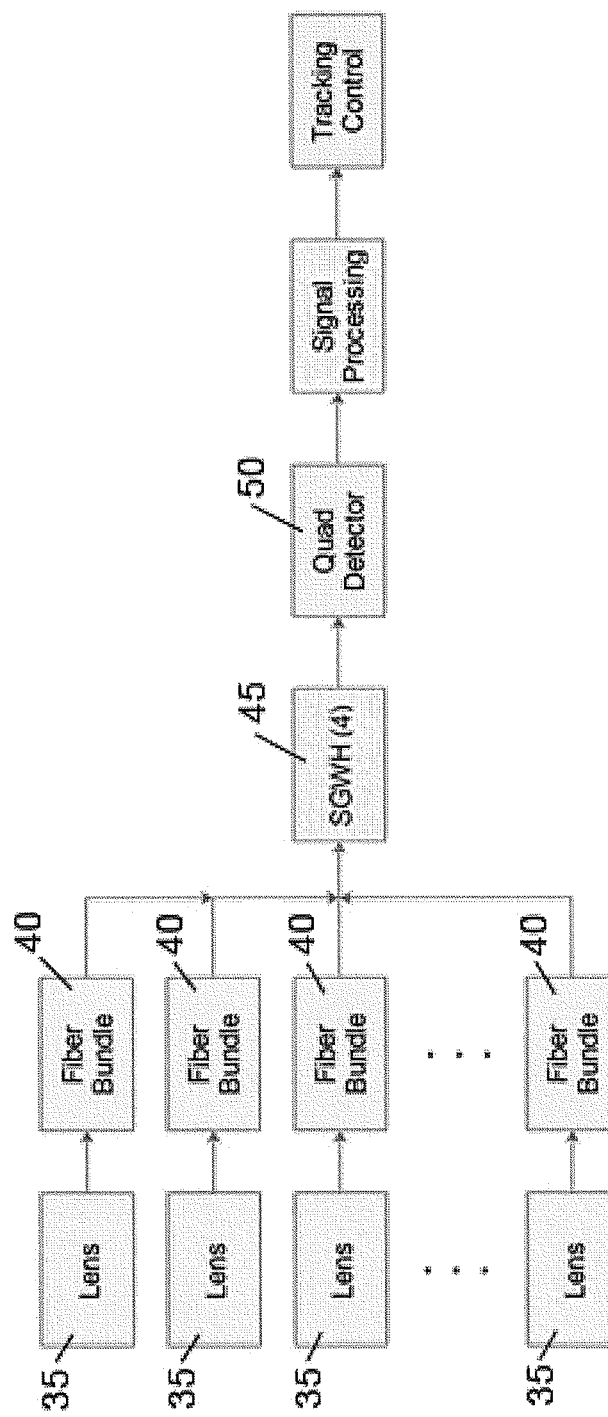
FIG. 2 shows Block Diagram of the Operation of the subject invention.

An example implementation is configured to guide a missile to a designated target. This CELIS example includes a MACRO with a plurality of lenses 35. Each lens has a small FOV (6.25° in this example). The lenses are arranged on a surface that is curved so that the withal to the center of each lens is pointed in the direction, relative to the other lenses, of its portion of the CELIS FOV. The lenses are arrayed in quadrants, aligned to the direction change capabilities of the missile (for example, up-left, up-right, down-left, and down-right to provide azimuth and elevation signals). The individual lens FOVs are tiled in such a way as to cover the entire CELIS FOV. In this example, with each lens covering 6.25° and the CELIS FOV being 50° full cone angle, the diameter of the MACRO will contain eight lenses. To fill a CELIS FOV of 50° full cone angle, a total of 52 lenses are required in this example (FIG. 1-2).

In this example, all the light received by an individual quadrant is collected by a set of light guides or fiber bundles 45. The configuration of the light guide or fiber bundle restricts the individual lens FOV to its designated 6.25° section. The light from the 13 lenses in each 25° pie-shaped quadrant is combined into a single output. The light then passes through a spectral filter 50, which is an SGH in this example, and is directed to a single detector covering that quadrant. Comparison of the responses of the responses of the four detectors, each representing one quadrant, are then compared to determine the correction values to be sent to the direction control electronics.

The MACRO is a multilens array mounted on a curved surface, where the angular deviation of each lens from the center of the MACRO FOV is such that the lens is pointing exactly in the direction centered in the lens FOV assigned to that lens. This results in a significant reduction in aberration when compared to an individual lens with the diameter and FOV of the MACRO. In addition, since the MACRO uses thinner lenses than an individual lens with the same size and MACRO FOV, it is much lighter than an individual lens.

When two devices of the subject invention are used, the azimuth and elevation correction values generated by the tracking software can be reinterpreted, based on their values, as the two-dimensional angle between (a) a line from the tracker to the illumination spot and (b) a line defined by the center angle of the tracker's field of regard (FOR). This angle can then be used for many other purposes, including proportional navigation (ProNav), as well as simply describing the location of the spot in tracker-oriented space. Furthermore, two such units, separated by a known distance and with a known value of relative alignment, can use parallax to add a distance measurement, thereby locating the spot in three dimensions. This three-dimensional position knowledge can be used for more accurate tracking or for maintaining a specific distance between the tracker and the spot, as well as simply improving the knowledge of the spot's location in space.

There are many advantages to using the angular measurements of the tracker directly, rather than only for line-of-sight tracking. ProNav, for example, requires an angle between the direction of motion of the tracker and the location of the spot it is tracking. It would potentially be possible to located more than one spot using a single tracker. Combining two such trackers to create a three-dimensional location of the spot is even better, making it possible to improve the accuracy of the tracker's motion, such as on a missile or on a landing spacecraft. The distance value can be used to keep the tracker in a specific location with respect to the spot. This can be used for coordinating swarms of spacecraft, keeping aircraft in precise locations compared to each other, and keeping a vehicle in a convoy at a specified location with respect to a spot on another vehicle in the convoy.

This exploitation of tracking technology can be very accurate, yet relatively inexpensive. A vehicle convoy can be protected against mutual collisions without the need for a new radar or ladar system, either of which will be more expensive than this application of the tracker measurements. Thus, with a combination of two or more units of the subject invention, in which the signals describing the angles between each tracking device and the target are interpreted specifically as angles; the distances between each pair of units is known; the combination of the measured angles and known distances between units is interpreted as a parallax measurement; then the parallax measurement may be used to determine the distance to the target.

Further, the distances and angles may be combined to define the target location in three dimensions. The distance to the target may be used to control the distance between the tracking device and a known source. With the method of the subject invention the known source may be moving, and it may be used for situational awareness to prevent a collision between the tracking device and the target.

In addition, the method of the subject invention may be used for situational awareness to keep two or more units in constant positions relative to each other It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. A method for tracking an object, comprising:
    (a) providing a tracking system having at least two optical trackers, each optical tracker having a lens array;
    (b) collecting a signal with the lens array of each optical tracker;
    (c) filtering each signal, selecting specific wavelengths or wavelength ranges, and limiting the angular field of view of each lens for each optical tracker;

(d) directing each filtered signal to one or more photodetectors-for each optical tracker;

(e) processing the output of the one or more photodetectors for each optical tracker so that a correction signal is produced, which describes an angular difference between a pointing direction of the correction signal and a pointing direction of a tracking device;

(f) sending the correction signals to a direction control system for implementation, wherein the optical trackers are separated by a known distance, and have a known value of relative alignment; and (g) using parallax to determine the distance to the object and thereby locating the object in three dimensions.

2. The method of claim 1 wherein the lens array is mounted to a curved surface.

3. The method of claim 1 wherein the filtering step comprises utilizing two holographic optical elements integrated on a flat glass substrate.

4. The method of claim 1 wherein the step of directing the signal to one or more photodetectors utilizes an optical fiber bundle.

5. The method of claim 1 wherein the step of directing the signal to one or more photodetectors utilizes a light guide.

6. The method of claim 1 wherein filtering the signal to limit angular field of view is with the light guide.

7. The method of claim 1 wherein filtering the signal to select specific wavelengths is with one or more optical bandpass filters.

8. The method of claim 7 wherein each optical bandpass filter is formed from a combination of a shortpass filter and a longpass filter.

9. The method of claim 1 wherein the one photodetector comprises a single detector whose output indicates the position of a light on the detector.

10. A method for tracking an object, utilizing a compound eye laser illumination seeker system, said system comprising at least two multi aperture compound receiver optics, each optic having a lens array, the lens array being aligned with a light guide array, a spectral and angle filter for eliminating extraneous light and sending a signal to a set of detectors for each receiver optic; a processor for processing the output to calculate a correction signal for each receiver optic separately, said spectral and angle filter comprising a holographic optical lens integrated on a flat transparent substrate and a direction control system for receiving the correction signal and implementing the correction signal, knowing a value of relative alignment with the other optic, using parallax to determine the distance to the object and thereby locating the object in three dimensions.

11. The compound eye laser illumination seeker of claim 10 wherein each set of detectors comprise four photo detectors.

12. The illumination seeker of claim 10 including the step of filtering the signal with a substrate guided holographic relay utilizes a combined angular and spectral filter.

13. The method of claim 10, including the steps of
interpreting the signals describing the angles between each optical tracker and a target as angles;
knowing the distance between each optic;
interpreting the combination of the angles and known distances between the optical trackers as a parallax measurement;
and using the parallax measurement to determine the distance to the target.

14. The method of claim 13 which the distances and angles are combined to define a target location in three dimensions.

15. The method of claim 13 in which the distance to the target is used to control the distance between the tracking device and a target.

16. The method of claim 14 in which the target is moving.

17. The method of claim 13 used for situational awareness to prevent a collision between the tracking device and the target.

18. The method of claim 13 used for situational awareness to keep two or more targets in constant positions relative to each other.

* * * * *